United States Patent [19]

Zavisza

[11] 4,420,600

[45] Dec. 13, 1983

[54] POLYURETHANE ELASTOMERS FROM HINDERED ALIPHATIC DIISOCYANATES

[75] Inventor: Daniel M. Zavisza, Frederick, Md.

[73] Assignee: American Cyanamid Company, Stamford, Conn.

[21] Appl. No.: 450,628

[22] Filed: Dec. 17, 1982

[51] Int. Cl.³ .............................................. C08G 18/32
[52] U.S. Cl. ...................................... 528/60; 252/182;
252/431 C; 502/170
[58] Field of Search ............... 252/182, 431 C; 528/60

[56] References Cited

U.S. PATENT DOCUMENTS 2,723,265 11/1955 Stallmann ........................... 528/290
3,290,350 12/1966 Hoover ............................... 526/312
3,823,118 7/1974 Matsunuga et al. .................. 528/60

Primary Examiner—Maurice J. Welsh
Attorney, Agent, or Firm—Steven J. Hultquist

[57] ABSTRACT

A curvature composition for curing polyurethane prepolymers prepared from hindered aliphatic diisocyanates, comprising (a) a $C_2$–$C_{10}$ diol, (b) a $C_3$–$C_{10}$ aminodiol and (c) a catalytically effective amount of a curing catalyst, and containing 50–99 equivalents of hydroxyl from the diol (a) and 1–50 equivalents of hydroxyl and amino groups from the aminodiol (b) per 100 equivalents of isocyanate groups of the polyurethane prepolymer.

20 Claims, No Drawings

POLYURETHANE ELASTOMERS FROM HINDERED ALIPHATIC DIISOCYANATES

Hindered aliphatic diisocyanates of the formula:

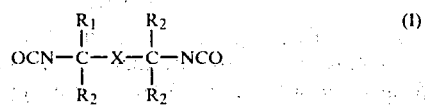

wherein $R_1$ is hydrogen or $C_1$-$C_8$ alkyl, $R_2$ is $C_1$-$C_8$ alkyl or substituted $C_1$-$C_8$ alkyl, and X is a bridging unit, are known and described in the patent literature, as for example in Stallmann, U.S. Pat. No. 2,723,265, and Hoover, U.S. Pat. No. 3,290,350. Diisocyanates defined by formula (I) wherein both $R_1$ and $R_2$ are methyl and X is an arylene bridging group, that is, of the formula:

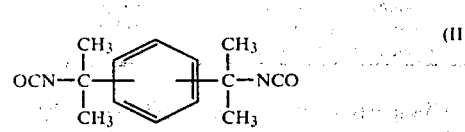

are readily prepared by the procedure described in the Hoover patent. These diisocyanates are useful in a wide range of polyurethane products, especially in castable and thermoplastic elastomer compositions, by application of well-known, conventional polyurethane forming techniques.

For use in cast polyurethane end use applications, it frequently is advantageous to convert the diisocyanate to a prepolymer by reacting it with a hydroxyl-terminated polyester or polyether, by conventional known methods. The prepolymer is then cast and cured in a mold in the presence of a diol or diamine, and preferably a catalyst such as dibutyltin dilaurate, to effect chain extension and/or crosslinking.

Curing of the polymer with a mixture of a diol, e.g., 1,4-butanediol, and a triol such as trimethylolpropane has been employed by the prior art to produce a polyurethane product having a higher modulus and tensile strength than the corresponding product cured with the diol alone.

It is an object of this invention to provide polyurethane elastomers prepared from hindered aliphatic diisocyanates which have better stress-strain properties than the high modulus, high tensile strength prior art polyurethane products obtained by curing of the prepolymer with a diol/triol mixture.

In accordance with the present invention, it has been discovered that polyurethane elastomers, having improved stress-strain properties, can be prepared by curing polyurethane prepolymers prepared from hindered aliphatic diisocyanates of the type represented by formula (I) above, with a curing mixture comprising a $C_2$-$C_{10}$ diol, a $C_3$-$C_{10}$ aminodiol, and an effective amount of a catalyst, the curing mixture containing 50-99 equivalents of hydroxyl from the diol, and 1-50 equivalents of hydroxyl and amino groups from the aminodiol per 100 equivalents of isocyanate groups in said prepolymer.

In a preferred embodiment, the curing mixture contains 90-95 equivalents of hydroxyl from the diol, and 5-10 equivalents of hydroxyl and amino groups from the aminodiol per 100 equivalents of isocyanate groups in said prepolymer.

In a particularly preferred embodiment, the diisocyanate of formula (I) is 1,4-bis(1-isocyanato-1-methylethyl)benzene, the diol is 1,4-butanediol, and the aminodiol is 2-amino-2-methyl-1,3-propanediol.

The polyurethane elastomers of the present invention have improved modulus, tensile strength, elongation at the breaking point, and hardness.

Suitable hindered diisocyanates which may be used to prepare the prepolymer include, but are not limited to, the following:

1,4-bis(1-isocyanato-1-methylethyl)benzene,
1,3-bis(1-isocyanato-1-methylethyl)benzene,
1,4-bis(1-isocyanatoethyl)benzene,
1,3-bis(1-isocyanatoethyl)benzene,
1-(1-isocyanato-1-methylethyl)-4-(1-isocyanatoethyl)benzene,
1-(1-isocyanato-1-methylethyl)-3-(1-isocyanatoethyl)benzene,
1,4-bis(1-isocyanato-1-methylpropyl)benzene,
1,4-bis(1-isocyanato-3-chloropropyl)benzene,
2,5-bis(1-isocyanato-1-methylethyl)naphthalene,
2,5-bis(1-isocyanatoethyl)naphthalene,
1,4-bis(1-isocyanato-1-methylethyl)cyclohexane,
1,8-diisocyanato-p-methane
and the like.

Suitable hydroxy-terminated polyesters and polyethers, which may be reacted with the hindered diisocyanate to prepare the prepolymer, include, but are not limited to, the following:

poly(ethylene adipate),
poly(1,4-butylene glycol),
poly(propylene glycol),
poly(ethylene glycol),
and the like.

Suitable diols, which may be used as a curative in the curing mixture, non-limitingly include the following:

1,4-butanediol,
1,6-hexanediol,
1,4-cyclohexanediol,
1,3-propanediol,
1,4-bis(hydroxymethyl)cyclohexane,
1,4-bis(2-hydroxyethyl)benzene,
and the like.

Suitable aliphatic aminodiols, which may be used as a curative in the curing mixture, non-limitingly include the following:

2-amino-1,3-propanediol,
2-amino-1,4-butanediol,
4-amino-1,3-butanediol,
3-amino-1,2-propanediol,
2-amino-2-methyl-1,3-propanediol,
2-amino-2-ethyl-1,3-propanediol,
3-amino-1,2-butanediol,
2-amino-1,4-bis(hydroxymethyl)cyclohexane,
and the like.

The catalyst used to cure the prepolymer generally is usefully employed in an amount from about 0.02-0.04% by weight, based on the weight of the prepolymer.

Illustrative examples of suitable catalysts, alone or in combination, include the following:

dibutyltin dilaurate,
dibutyltin diacetate,
dimethyltin dilaurate,
lead naphthenate,
and the like. Such catalysts are well-known in the art.

Optionally, the prepolymer may be cured in the presence of a free radical scavenger, which is defined as a hindered phenol antioxidant used to protect polymeric substrates against oxidative degradation. Illustrative examples of such free radical scavengers include, but are not limited to, the following:

Tetrakis[methylene-2-(2',5'-di-t-butyl-4'-hydroxyphenyl)propionate]methane—Irganox 1010, Ciba-Geigy; 2,2'-methylenebis(4-ethyl-6-t.butylphenol)—Cyanox®425, American Cyanamid; 2,2'-methylenebis(4-methyl-6-t.butylphenol)-CYANOX 2246, American Cyanamid; tris(4-t.butyl-3-hydroxy-2,6-dimethylbenzyl)-s-triazine-2,4,6-(1H, 3H, 5H)trione, CYANOX 1790, American Cyanamid; octadecyl-3-(3',5'-di-t.butyl-4'-hydroxyphenyl)propionate—Irganox 1076, Ciba-Geigy; thiodiethylenebis(3,5-di-t.butyl-4-hydroxy)hydrocinnamate—Irganox 1035, Ciba-Geigy; distearyl (2,6-di-t.butyl-4-hydroxyphenyl)phosphate—Irganox 1093, Ciba-Geigy; tris(2,4-di-t.butylphenol)phosphite—Irgaphos 168, Ciba-Geigy; 1,1,3-tri(5-t.butyl-4-hydroxy-2-methylphenol)butane—Topanol CA, ICI, and the like. The preferred free radical scavenger is Irganox 1010.

The amount of radical scavenger incorporated into the compositions generally will usefully range from about 0.05 to 1.0 percent by weight, based on total weight of prepolymer, and preferably, will be used in an amount ranging from about 0.1 to 0.5 percent by weight.

The radical scavenger may be incorporated into the compositions at any convenient point before or during the curing step. The easiest and most convenient method is to incorporate the radical scavenger into either the prepolymer or into one or more of the diol or aminodiol curatives, it being important only that the radical scavenger be incorporated in the resulting elastomeric product.

The following non-limiting examples are illustrative of the present invention. All parts and percentages are by weight unless otherwise indicated.

EXAMPLE 1

Poly(ethylene adipate) (400 grams; 0.764 mole) is added to a reaction vessel equipped with a stirrer, thermometer, and nitrogen bleed, and heated under vacuum at 100° C. for 2 hours to remove volatiles. The poly(ethylene adipate) is then cooled to 70° C. and poured into a dropping funnel which has been preheated to 70° C. Benzoyl chloride (0.16 gram) is added to the poly(ethylene adipate) and the mixture is stirred to form a uniform mixture.

1,4-Bis(1-isocyanato-1-methylethyl)benzene (402.2 grams; 1.647 moles) is added to the above reaction vessel, and 1.6 grams of a 10% solution of dibutyltin dilaurate (M&T* catalyst T-12) in toluene is added thereto. The poly(ethylene adipate) is then slowly added to the resulting mixture over a period of one hour while maintaining the reaction temperature at 75°–80° C. Upon completion of the addition of the poly(ethylene adipate), the resulting polymer is heated at 80° C. for 5 hours. The reaction product is then cooled to ambient temperature and recovered from the reaction vessel. Analysis of the product shows that the isocyanate content is 9.86%.

*a trademark of M&T Chemicals, Inc.

EXAMPLE 2

The product of Example 1 (50.0 grams) is cast and cured in a mold at 100° C. for one hour using as a curative 0.1 ml of a 5% solution of M&T catalyst T-12 in toluene, 1,4-butanediol (4.91 grams; 0.0545 mole) and trimethylolpropane (0.36 gram; 0.0027 mole) to provide 93% and 7%, respectively, of the equivalents of hydroxyl group required. After one hour in the mold, the elastomer is post-cured at 100° C. for 16 hours and tested for stress-strain properties. The results obtained are given in Table I.

EXAMPLE 3

A similar casting is prepared and cured, as described in Example 2, except that 2-amino-2-methyl-1,3-propanediol (0.28 gram; 0.0027 mole) is substituted for the trimethylolpropane to provide 7% of the total equivalents of hydroxyl and amino groups required. The results obtained are given in Table I.

TABLE 1

|  | Example 2 | Example 3 |
|---|---|---|
| Hardness, Shore D | 64 | 66 |
| Modulus, 100%, psi | 1302 | 1341 |
| Modulus, 200%, psi | 2147 | 2194 |
| Modulus, 300%, psi | 3860 | 3969 |
| Tensile strength, psi | 4312 | 6134 |
| Elongation at break, % | 427 | 412 |

Comparison of the data in Table I shows that the substitution of 2-amino-2-methyl-1,3-propanediol for trimethylolpropane significantly improves the tensile strength, while not substantially affecting the modulus, or decreasing the elongation.

EXAMPLE 4

Poly(1,4-butylene glycol) (779.7 grams; 0.3898 mole) is added to a reaction vessel equipped with a stirrer, thermometer, and nitrogen bleed, and heated under vacuum at 100° C. for 2 hours to remove volatile materials. The poly(1,4-butylene glycol) is then cooled to 80° C. and poured into a dropping funnel which has been preheated to 80° C.

1,4-Bis(1-isocyanato-1-methylethyl)benzene (200.0 grams; 0.8193 mole) is added to the above reaction vessel, and 2.0 mls of a 10% solution of a catalyst (M&T catalyst T-12) in toluene is added thereto. The poly(1,4-butylene glycol) is then slowly added to the resulting mixture over a period of one hour while maintaining the temperature at 75°–80° C. Upon completion of the addition of the poly(1,4-butylene glycol), the polymer is heated at 85° C. for 6 hours, cooled to ambient temperature, and recovered from the reaction vessel. Analysis of the product shows that the isocyanate content is 3.60%.

EXAMPLE 5

The product of Example 4 (50.0 grams) is cast and cured in a mold at 100° C. for one hour using as a curative 0.1 ml of a 5% solution of M&T catalyst T-12 in toluene, 1,4-butanediol (1.79 grams; 0.0199 mole) and trimethylolpropane (0.13 gram; 0.001 mole) to provide 93% and 7%, respectively, of the equivalents of hydroxyl group required. After one hour in the mold, the elastomer is post-cured at 65° C. for 60 hours and tested for stress-strain properties.

EXAMPLE 6

A similar casting is prepared and cured, as described in Example 5, except that 2-amino-2-methyl-1,3-propanediol (0.11 gram; 0.001 mole) is substituted for the trimethylolpropane to provide 7% of the total equivalents of hydroxyl and amino groups required.

The results obtained are given in Table II under Examples 5 and 6, respectively.

TABLE II

|  | Example 5 | Example 6 |
|---|---|---|
| Hardness, Shore A | 80 | 81 |
| Modulus, 100%, psi | 439 | 487 |
| Modulus, 200%, psi | 558 | 577 |
| Modulus, 300%, psi | 738 | 754 |
| Modulus, 400%, psi | 1089 | 1094 |
| Modulus, 500%, psi | 1724 | 1649 |
| Tensile strength, psi | 3813 | 4132 |
| Elongation at break, % | 635 | 664 |

The data in Table II show that the substitution of 2-amino-2-methyl-1,3-propanediol for trimethylolpropane improves the tensile strength of the casting.

What is claimed is:

1. A curative composition for curing polyurethane prepolymers prepared from hindered aliphatic diisocyanates, comprising (a) a $C_2$–$C_{10}$ diol, (b) a $C_3$–$C_{10}$ aminodiol and (c) a catalytically effective amount of a curing catalyst, and containing 50–99 equivalents of hydroxyl from said diol (a) and 1–50 equivalents of hydroxyl and amino groups from said aminodiol (b) per 100 equivalents of isocyanate groups of the polyurethane prepolymer.

2. A curative composition according to claim 1, containing 90–95 equivalents of hydroxy from said diol (a) and 5–10 equivalents of hydroxyl and amino groups from said aminodiol (b) per 100 equivalents of isocyanate groups of said polyurethane prepolymer.

3. A curative composition according to claim 1 wherein said diol (a) is selected from the group consisting of 1,4-butanediol, 1,6-hexanediol, 1,4-cyclohexanediol, 1,3-propanediol, 1,4-bis(hydroxymethyl)cyclohexanes and 1,4-bis(2-hydroxyethyl)benzene.

4. A curative composition according to claim 1 wherein said aminodiol (b) is selected from the group consisting of 2-amino-1,3-propanediol, 2-amino-1,4-butanediol, 4-amino-1,3-butane-2-amino-2-methyl-1,3-propanediol, 2-amino-2-ethyl-1,3-propanediol, 3-amino-1,2-butanediol, and 2-amino-1,4-bis(hydroxymethyl)-cyclohexene.

5. A curative composition according to claim 1 wherein said diol (a) is 1,4butanediol and said aminodiol is 2-amino-2-methyl-1,3-propanediol.

6. A curative composition according to claim 1 wherein said curing catalyst (c) is selected from the group consisting of dibutyltin dilaurate, dibutyltin diacetate, dimethyltin dilaurate, and lead naphthenate.

7. A polyurethane composition comprising the reaction product of (1) a polyurethane prepolymer and (2) a curing mixture containing (a) a $C_2$–$C_{10}$ diol, (b) a $C_3$–$C_{10}$ aminodiol and (c) a catalytically effective amount of a curing catalyst for said reaction.

8. A polyurethane composition according to claim 7 wherein said curing mixture (2) contains 50–99 equivalents of hydroxyl from said diol (a) and 1–50 equivalents of hydroxyl and amino groups from said aminodiol (b) per 100 equivalents of isocyanate groups of the polyurethane prepolymer (1).

9. A polyurethane composition according to claim 7 wherein said polyurethane prepolymer (1) is the reaction product of a hydroxyl-terminated polyester or polyether, and an aliphatic diisocyanate of the formula:

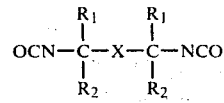

wherein $R_1$ is hydrogen or $C_1$–$C_8$ alkyl, $R_2$ is $C_1$–$C_8$ alkyl or substituted $C_1$–$C_8$ alkyl and x is arylene.

10. A polyurethane composition according to claim 9, wherein said aliphatic diisocyanate is:

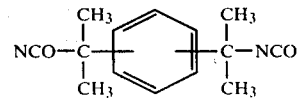

11. A polyurethane composition according to claim 9, wherein said aliphatic diisocyanate is 1,4-bis(1-isocyanate-1-methylethyl)benzene.

12. A polyurethane composition according to claim 7 wherein said diol (a) is 1,4-butanediol and said aminodiol (b) is 2-amino-2-methyl-1,3-propanediol.

13. A polyurethane composition according to claim 7 wherein said polyurethane prepolymer (1) is the reaction product of: a polyester or polyether selected from the group consisting of poly(ethylene adipate), poly(1,4-butylene glycol), poly(propylene glycol), and poly(ethylene glycol); and a diisocyanate selected from the group consisting of:
  1,4-bis(1-isocyanate-1-methylethyl)benzene,
  1,3-bis(1-isocyanato-1-methylethyl)benzene,
  1,4-bis(1-isocyanatoethyl)benzene,
  1,3-bis(1-isocyanatoethyl)benzene,
  1-(1-isocyanateo-1-methylethyl)-4-(1-isocyanatoethyl)benzene,
  1-(1-isocyanato-1-methylethyl)-3-(1-isocyanatoethyl)benzene,
  1,4-bis(1-isocyanato-1-methylpropyl)benzene,
  1,4-bis(1-isocyanato-3-chloropropyl)benzene,
  2,5-bis(1-isocyanato-1-methylethyl)naphthalene,
  1,8-diisocyanato-p-menthane,
  2,5-bis(1-isocyanatoethyl)naphthalene, and
  1,4-bis(1-isocyanato-1-methylethyl)cyclohexane.

14. A polyurethane elastomer according to claim 7 wherein said curing catalyst is selected from the group consisting of: dibutyltin dilaurate, dibutyltin diacetate, dimethyltin dilaurate, and lead naphthenate.

15. A polyurethane composition according to claim 7 wherein said diol (a) is selected from the group consisting of 1,4-butanediol, 1,6-hexanediol, 1,4-cyclohexanediol, 1,3-propanediol, 1,4-bis(hydroxymethyl)cyclohexane, and 1,4-bis(2-hydroxyethyl)benzene; and said aminodiol (b) is selected from the group consisting of 2-amino-1,3-propanediol, 2-amino-1,4-butanediol, 4-amino-1,3-butanediol, 3-amino-1,2-propanediol, 2-amino-2-methyl-1,3-propanediol, 2-amino-2-ethyl-1,3-propanediol, 3-amino-1,2-butanediol, and 2-amino-1,4-bis(hydroxymethyl)cyclohexane.

16. A polyurethane composition according to claim 7 wherein said reaction product further comprises a free radical scavenger in an amount of from about 0.5 to about 1.0 by weight, based on total weight of said prepolymer.

17. A method of forming a polyurethane elastomer from a polyurethane prepolymer, comprising: mixing said prepolymer with a curative composition containing (a) a $C_2$–$C_{10}$ diol, (b) a $C_3$–$C_{10}$ aminodiol and (c) a catalytically effective amount of a curing catalyst; and curing the resulting mixture at elevated temperature to yield said polyurethane elastomer.

18. A method according to claim 17 wherein said curative composition contains 50-99 equivalents of hydroxyl from said diol (a) and 1-50 equivalents of hydroxyl and amino groups from said aminodiol (b) per 100 equivalents of isocyanate groups of the polyurethane prepolymer.

19. A method according to claim 17 comprising forming said polyurethane prepolymer by reacting a hydroxyl-terminated polyester or polyether, and an aliphatic diisocyanate of the formula:

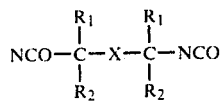

wherein $R_1$ is hydrogen or $C_1$–$C_8$ alkyl, $R_2$ is $C_1$–$C_8$ alkyl or substituted $C_1$–$C_8$ alkyl and x is arylene.

20. A method according to claim 19 wherein said aliphatic diisocyanate is 1,4-bis(1-isocyanato-1-methylethyl)benzene.

* * * * *